US009977566B2

(12) United States Patent
Jitkoff et al.

(10) Patent No.: US 9,977,566 B2
(45) Date of Patent: May 22, 2018

(54) COMPUTERIZED SYSTEMS AND METHODS FOR RENDERING AN ANIMATION OF AN OBJECT IN RESPONSE TO USER INPUT

(71) Applicant: Google Inc., Mountain View, CA (US)

(72) Inventors: John Nicholas Jitkoff, Kingsville, TX (US); Christian Robertson, Pleasanton, CA (US); Alastair Tse, New York, NY (US)

(73) Assignee: Google LLC, Mountain View, CA (US)

( * ) Notice: Subject to any disclaimer, the term of this patent is extended or adjusted under 35 U.S.C. 154(b) by 225 days.

(21) Appl. No.: 14/747,379

(22) Filed: Jun. 23, 2015

(65) Prior Publication Data

US 2015/0370444 A1 Dec. 24, 2015

Related U.S. Application Data

(60) Provisional application No. 62/016,618, filed on Jun. 24, 2014.

(51) Int. Cl.

| | |
|---|---|
| ***G06F 3/0481*** | (2013.01) |
| ***G06F 3/0484*** | (2013.01) |
| ***G06T 11/00*** | (2006.01) |
| ***G06T 13/80*** | (2011.01) |
| ***G09G 5/377*** | (2006.01) |

(52) U.S. Cl.

CPC ...... *G06F 3/04812* (2013.01); *G06F 3/04842* (2013.01); *G06T 11/001* (2013.01); *G06T 13/80* (2013.01); *G09G 5/377* (2013.01); *G06T 2200/24* (2013.01)

(58) Field of Classification Search

CPC ....... G06F 3/04845; G06F 2203/04806; G06F 3/033; G06F 3/0481; G06F 3/04812; G06F 3/04895; G06F 3/04842; H04N 5/23212; H04N 5/23216; H04N 5/23296; H04N 7/17318; G03B 13/16; G03B 17/20; G06T 13/80; G06T 11/001; G06T 3/0018; G06T 3/0025; G09G 5/377; G09G 5/397

See application file for complete search history.

(56) References Cited

U.S. PATENT DOCUMENTS 5,767,835 A * 6/1998 Obbink ............... G06F 3/04842 715/727
5,880,729 A * 3/1999 Johnston, Jr. ......... G06F 9/4443 715/823

(Continued)

OTHER PUBLICATIONS

European Patent Office, European Search Report for related European Application No. EP 15173433.2, dated Nov. 17, 2015 (8 pages).

*Primary Examiner* — Nicholas Ulrich
(74) *Attorney, Agent, or Firm* — Dority & Manning, P.A.

(57) ABSTRACT

Computer-implemented systems and methods are provided for rendering an animation of an object in response to a user selection in a user interface. In accordance with some embodiments, an indication of a selection of a user interface element may be received, and characteristics of the user interface element may be identified. Coordinates corresponding to a spatial location of the user selection may be determined. An animation of an object that changes over time may then be rendered based on the user coordinates and the identified characteristics of the user interface element.

20 Claims, 11 Drawing Sheets

500

250
510
Time 1

250
510
Time 2

250
510
Time 3

(56) References Cited

U.S. PATENT DOCUMENTS

| | | | | |
|---|---|---|---|---|
| 8,843,849 | B2 * | 9/2014 | Neil | G06F 3/0482 345/173 |
| 9,549,165 | B2 * | 1/2017 | Choi | H04N 13/0011 |
| 2001/0024195 | A1 * | 9/2001 | Hayakawa | G06F 3/04847 345/173 |
| 2001/0048448 | A1 * | 12/2001 | Raiz | G06F 9/4443 715/700 |
| 2004/0075699 | A1 * | 4/2004 | Franchi | G06F 9/4443 715/860 |
| 2005/0235226 | A1 | 10/2005 | Watanabe et al. | |
| 2006/0055700 | A1 * | 3/2006 | Niles | G06T 13/20 345/473 |
| 2006/0103118 | A1 * | 5/2006 | Hasebe | B60R 21/233 280/729 |
| 2006/0215987 | A1 * | 9/2006 | Horentrup | G06F 3/0482 386/248 |
| 2007/0055947 | A1 * | 3/2007 | Ostojic | G06T 3/0018 715/800 |
| 2008/0320394 | A1 * | 12/2008 | Womack | G06Q 30/0277 715/730 |
| 2009/0094518 | A1 * | 4/2009 | Lawther | G06F 3/04817 715/716 |
| 2009/0100366 | A1 * | 4/2009 | Fitzmaurice | G06F 3/04815 715/767 |
| 2009/0150813 | A1 * | 6/2009 | Chang | G06F 3/0481 715/764 |
| 2009/0207175 | A1 * | 8/2009 | Warner | G06T 13/00 345/473 |
| 2009/0293007 | A1 * | 11/2009 | Duarte | G06F 3/0481 715/767 |
| 2009/1028991 | | 11/2009 | Cho | |
| 2010/0077345 | A1 * | 3/2010 | Swingler | G06F 3/0481 715/802 |
| 2010/0321303 | A1 * | 12/2010 | Kwok | G06F 3/04886 345/173 |
| 2011/0238690 | A1 | 9/2011 | Arrasvuori et al. | |
| 2013/0063380 | A1 * | 3/2013 | Wang | G06F 3/04883 345/173 |
| 2013/0174094 | A1 * | 7/2013 | Heo | G06F 3/04883 715/835 |
| 2013/0227450 | A1 | 8/2013 | Na et al. | |
| 2013/0254693 | A1 | 9/2013 | Oh | |
| 2013/0285961 | A1 * | 10/2013 | Townsend | G06F 3/0488 345/173 |
| 2014/0035829 | A1 * | 2/2014 | Hyde | G06F 1/1694 345/173 |
| 2015/0113483 | A1 * | 4/2015 | Van Der Westhuizen | G06F 3/04812 715/850 |
| 2015/0160779 | A1 * | 6/2015 | Huang | G06F 3/0418 345/174 |
| 2015/0277714 | A1 * | 10/2015 | Wang | G06F 3/04845 715/767 |

* cited by examiner

COMPUTERIZED SYSTEMS AND METHODS FOR RENDERING AN ANIMATION OF AN OBJECT IN RESPONSE TO USER INPUT

CROSS-REFERENCE TO RELATED APPLICATION(S)

This application claims the benefit of U.S. Provisional Patent Application No. 62/016,618, filed Jun. 24, 2014, the contents of which are expressly incorporated herein by reference in their entirety.

BACKGROUND

The present disclosure relates to computerized systems and method for rendering an animation and, more generally, the field of user interface design. By way of example, and without limitation, the present disclosure relates to computerized systems and methods for rendering animation of an object in a user interface in response to a user input.

The use of applications on electronic devices has grown significantly over the years. People now interact with applications on a variety of devices, such as personal computers, laptops, tablets, personal digital assistants (PDAs), personal organizers, mobile phones, smart-phones, and other devices. Developers of applications design interactive interfaces for users of these applications to navigate through application content. With so many applications available today, developers have an incentive to make their applications attractive to users. One of the ways to do so is by making their application interfaces more aesthetically pleasing than those of other applications.

SUMMARY

Embodiments of the present disclosure relate to computerized systems and methods for rendering an animation of an object on a display. In addition, embodiments of the present disclosure relate to solutions for rendering animations in response to user inputs received through a user interface of an application.

In accordance with some embodiments of the present disclosure, computerized systems and methods are provided that may receive an indication of a selection of a user interface element in a user interface. Once the indication has been received, characteristics of the selected user interface element may be identified. Coordinates of the user selection may be determined, and an animation of an object may be rendered based on the coordinates and the identified characteristics of the selected element.

In accordance with some embodiments, there is provided a computer-implemented method for rendering an animation in a user interface. The method comprises operations performed by one or more processors. The operations of the method include receiving an indication of a selection of a user interface element in the user interface, and identifying characteristics of the selected element. The operations of the method also include determining coordinates for the user selection, wherein the coordinates correspond to a spatial location of the selection in the user interface. The operations of the method further include rendering an animation of an object based on the coordinates of the user selection and the identified characteristics of the selected element.

Furthermore, in accordance with some embodiments, there is provided a computer-implemented system for rendering an animation of an object in a user interface. The system includes a memory that stores instructions, and at least one processor that executes the instructions. The at least one processor executes the instructions to receive an indication of a selection of a user interface element in the user interface, and to identify characteristics of the selected element. The at least one processor also executes the instructions to determine coordinates for the user selection, wherein the coordinates correspond to a spatial location of the selection in the user interface. The at least one processor further executes the instructions to render an animation of an object based on the coordinates of the user selection and the identified characteristics of the selected element.

Additionally, in accordance with some embodiments, there is provided a non-transitory computer-readable medium storing a set of instructions that, when executed by one or more processors, cause the one or more processors to perform a method. The method comprises receiving an indication of a selection of a user interface element in a user interface, and identifying characteristics of the selected element. The method also comprises determining coordinates for the user selection, wherein the coordinates correspond to a spatial location of the selection in the user interface. The method further comprises rendering an animation of an object based on the coordinates of the user selection and the identified characteristics of the element.

Before explaining example embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

It is to be understood that both the foregoing general description and the following detailed description are explanatory only and are not restrictive of the claimed subject matter.

BRIEF DESCRIPTION OF THE DRAWINGS

The accompanying drawings, which are incorporated in and constitute part of this specification, and together with the description, illustrate and serve to explain the principles of various example embodiments.

DETAILED DESCRIPTION OF EXAMPLE EMBODIMENTS

Figure 1:
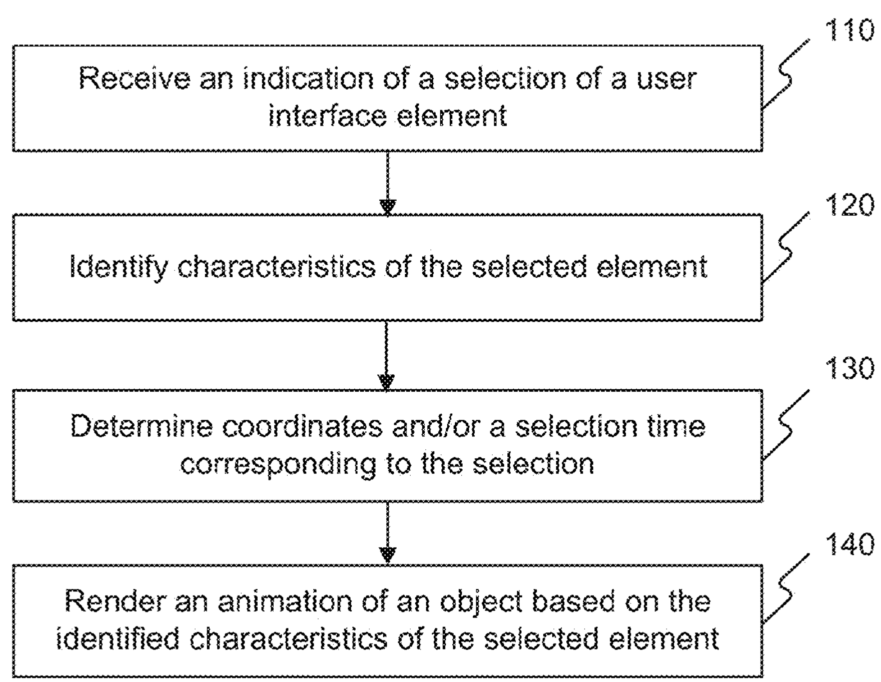
FIG. 1 illustrates a flowchart of an example method for rendering an animation in response to a user selection of a user interface element, consistent with embodiments of the present disclosure.

Reference will now be made in detail to the present embodiments of the disclosure, certain examples of which are illustrated in the accompanying drawings.

Embodiments of the present disclosure relate to computerized systems and methods for rendering an animation in a user interface in response to a selection of a user interface element. Embodiments of the present disclosure include systems and methods that receive an indication of a selection of a user interface element in a user interface, and that identify characteristics of the selected element. Once the indication is received, spatial coordinates of the user selection may be determined. An animation of an object that changes over time may then be rendered based on the coordinates of the user selection and the identified characteristics of the element.

In some embodiments, an application may include functionality to render animations of objects in response to user selections. For example, a developer of an application may associate the functionality with a user interface of the application, so that the animations are rendered in response to user selections. A user of the user interface may select an element in the user interface. In response to the user selection, characteristics of the selected element may be determined. In some embodiments, the characteristics may include one or more of a shape of the element, dimensions of the element, whether the element is bounded, a type of element, a color of the element, or any other characteristics associated with a user interface element. Coordinates corresponding to a spatial position in which the user selection occurred may also be determined, as well as a time of the selection. An animation of an object may then be rendered based on at least one of the characteristics of the selected element, the spatial coordinates, and the selection time.

One or more advantages may be achieved in rendering an animation in response to a user selection in a user interface. For example, it may be aesthetically pleasing to display an animation in response to a user selection. Moreover, rendering an animation in response to a user selection may make the user interface more intuitive. For example, displaying an animation may provide visual feedback that a selection was received, and may provide a user interface that feels more responsive and tactile to a user.

Making a user interface more aesthetically pleasing or more intuitive to users may be advantageous to developers. With so many applications on the market today, users have a wide variety of options from which to choose. Among other factors, users may choose an application that is more aesthetically pleasing, and the popularity of the application may increase. Moreover, developers of popular applications that include advertising may command higher prices for advertising spots in their applications than developers of less popular applications. However, developing a user interface that provides animations in response to user inputs may present challenges to developers. For example, a developer of an application may have to configure various attributes of an animation in order to create an animation response for a selection of a user interface element. Moreover, if the developer wishes to have different animation responses for different user interface elements, or even different animation responses with a common theme for different user interface elements, the developer will have to configure attributes for animation responses for each of the elements.

Embodiments of the present disclosure can address the challenges associated with rendering a visually appealing and/or intuitive animation in response to a user selection of a user interface element. For example, embodiments of the present disclosure provide computerized systems and methods that may render an animation of an object based on at least one of characteristics of a user interface element that was selected, spatial coordinates describing where the selection occurred, and/or a selection time corresponding to the selection. An operator, such as a developer of an application, may simply select to associate the animation with a user interface element, and the animation may be automatically rendered when a user selects the element based on at least one of the characteristics of the element, the spatial coordinates describing where the selection occurred, and the time at which the selection occurred.

An element of a user interface, as used herein, may include any element of a user interface. Such an element may include, for example, a button, icon, toolbar, control, link, scrollbar, menu, menu item, image, video, animation, text, background, window, hyperlink, drop-down list, slider, border, or any other portion of a user interface.

As used herein, rendering an animation of an object may refer to rendering the object on a display. In some embodiments, the animation of the object changes over time. For example, the object may expand over time, contract over time, change shape over time, change translucency over time, change color over time, or any combination of the above.

Throughout this application, a circle may be referred to as an example of an animated object. Rendering an animation of an expanding circle may cause a visual effect of a ripple, such as when an object drops in liquid. However, the disclosure is not so limited. An animated object may be a square, rectangle, triangle, oval, or any other shape.

FIG. 1 illustrates a flowchart of an example method 100, consistent with embodiments of the present disclosure. Example method 100 may be implemented in a computing environment (see, e.g., FIG. 11) using one or more computer systems (see, e.g., FIG. 10). In some embodiments, method 100 may be performed by one or more client devices 1120 or by one or more servers 1140. In some embodiments, one or more steps of method 100 may be performed by one or more client devices 1120, and one or more other steps of method 100 may be performed by one or more servers 1140.

In step 110 of FIG. 1, an indication of a selection of a user interface element may be received. For example, a user of a user interface of an application may select a user interface element. Such a selection may involve pressing the user interface element on a screen of the user interface by moving a pointer over the element and pressing a button, by pressing the element with the user's finger on a touch screen display, or by any other method of input (e.g., gesture input, voice command, etc).

In step 120, characteristics of the selected element may be received. The characteristics may include one or more of a shape of the element, a type of the element, a dimension of the element (e.g., a width, height, radius), whether the element is bounded, a color of the element, a size of the element, an area of the element, a volume of the element, and/or any other characteristics that may be associated with a user interface element. In some embodiments, the characteristics of each element are determined based on stored element or class definitions (e.g., in a table or database). In other embodiments, the selected element may be analyzed to determine the characteristics (e.g., graphical, content, comparative, and/or other analyses).

In step 130, coordinates and/or a selection time corresponding to the user selection may be determined. In some embodiments, the coordinates may be spatial coordinates indicating where the user selection was received in a user interface screen. For example, the coordinates may be indicated in any type of coordinate system, such as a Cartesian coordinate system, a polar coordinate system, a cylindrical coordinate system, a spherical coordinate system, etc. In some embodiments, the coordinate system used may depend on the shape of the user interface. In some embodiments, the coordinates may include a position at which a selection occurred along an x axis and along a y axis in a Cartesian coordinate system.

A selection time corresponding to the user selection may correspond to a time at which a selection event occurred. In some embodiments, the selection time may correspond to a time at which the user interface element was pressed, such as with a mouse button or a finger of the user on a touch screen interface. In some embodiments, the selection time may correspond to a time at which the user interface element is released, such as releasing a mouse button or removing a finger of the user from the user interface element on a touch screen interface. In some embodiments, selection times corresponding to each of a press and a release of the user interface element may be determined.

In step 140, an animation of an object may be rendered based on the identified characteristics of the element. In some embodiments, the animation of an object changes over time based on the identified characteristics of the element. In some embodiments, the animation of the object may also be rendered based on a determined selection time corresponding to the user selection and/or coordinates corresponding to the user selection.

In one example referred to herein, the rendered animation may be an animation of a circle that expands over time. In some embodiments, the circle may expand by drawing the circle with a radius that changes over time. The radius may change with a particular velocity and/or acceleration over time. In some embodiments, the rate at which the circle expands may vary based on characteristics of the user interface element. For example, if the user element is small (e.g., has small dimensions, small area, small volume), the velocity and/or acceleration at which the circle expands may be lower than when the user element is large (e.g., has large dimensions, large area, large volume). By changing the velocity and/or acceleration at which the circle expands based on the characteristics of the user interface element, the circle animation may appear to take a similar amount of time to expand to its maximum size within a user interface element regardless of the size of the user interface element.

In some embodiments, the circle may be animated to expand at a different velocity and/or acceleration based on whether the selection time corresponds to a press of the user interface element or a release of the user interface element. For example, the circle may expand at one velocity and/or acceleration while the user interface element is pressed, and at a different velocity and/or acceleration when the user interface element is released. In some embodiments, the circle may expand at a slower velocity and/or acceleration while the user interface element is pressed than after the user interface element has been released.

In some embodiments, a velocity and/or acceleration at which a circle expands in an animation may vary as the circle expands in size. For example, in some embodiments a velocity and/or acceleration at which a circle expands in an animation may increase as the circle expands, so that the circle expands more quickly as it grows larger in size.

In some embodiments, a maximum size to which the circle may expand may be set. The maximum size could be defined as a maximum radius, diameter, perimeter, area, or any other indication of the size of the circle. In some embodiments, the maximum size could be defined as a function of characteristics of the user interface element. For example, the circle may be configured to expand to a smaller maximum size in small user interface elements than in large user interface elements. In some embodiments, the circle may be animated so as to expand to its maximum size, and continue to be displayed at its maximum size, so long as the user interface element is pressed. In some embodiments, when the user interface element has been released, the circle may be animated to expand to its maximum size and then disappear from the user interface.

In some embodiments, the circle may be rendered differently depending on whether the user interface element is bounded or unbounded. For example, if the user interface element is bounded, the circle may be animated so as to conform to the shape of the user interface element when at its maximum size. If the user interface element is unbounded, such as a background of the user interface or an element without borders, the user interface element may be displayed in a circular shape when at its maximum size. In some embodiments, portions of the circular shape may be clipped as the circle expands depending on the identified characteristics of the user interface element.

In some embodiments, the circle may be animated such that the center of the circle migrates toward the center of the user interface element as the circle expands over time. For example, if a user clicks a button of a user interface in a lower right hand corner of the button, the circle may migrate so that the center of the circle is positioned closer to the center of the button as the circle expands over time. In some embodiments, the rate at which the circle migrates may be set so that the center of the circle is positioned at the center of the user interface element when the circle reaches its maximum size.

In some embodiments, the animation of the circle may be rendered in a color based on a color of the user interface element. For example, if the user interface element is dark blue, the circle may be rendered in a light blue color. In some embodiments, a shade of the color of the user interface element may change over time as the circle expands. In some embodiments, the shade of the color of the user interface element may change so that at some point in time as the circle expands, the shade of the color of the user interface element and the shade of the color of the circle is the same. Moreover, once the shade of the color of the circle and the shade of the color of the user interface element is the same, the color shades may be kept the same as the circle continues to expand. In such embodiments, the circle may appear to disappear when the shade of the color of the circle is the same as the shade of the color of the user interface element. Such embodiments may be used when a user interface element is very large, so that a user may not have to view the circle expand to a very large size.

Figure 2:
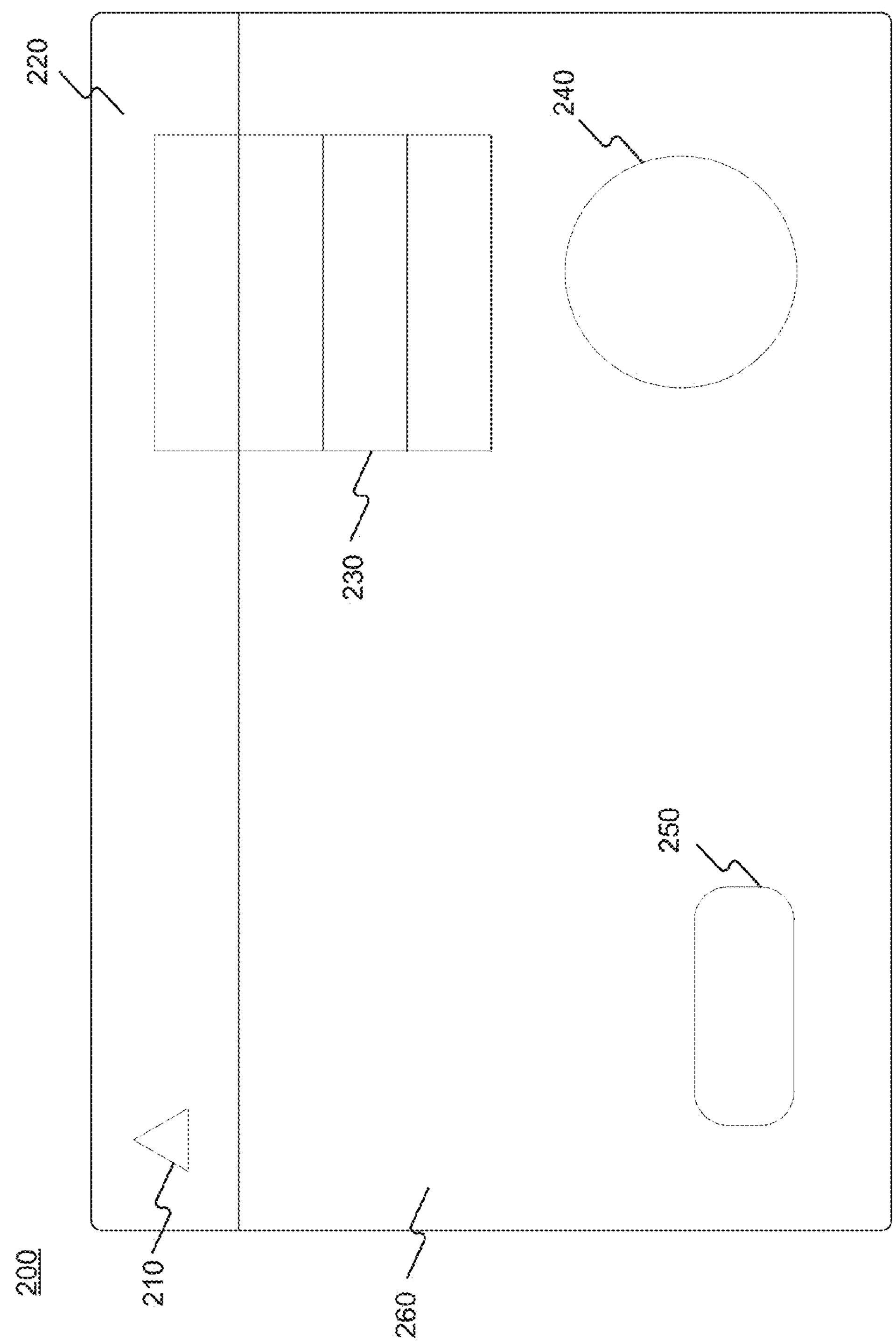
FIG. 2 illustrates an example user interface screen including a variety of different user interface elements, consistent with embodiments of the present disclosure.

FIG. 2 illustrates an example screen 200 of a user interface of an application with a variety of different user interface elements. Screen 200 may include one or more of an icon 210, a border 220, a menu 230 with menu items, a control 240, a button 250, and a background 260. Although six different user interface elements are illustrated in FIG. 2, the disclosure is not so limited. Any number and/or variety of user interface elements may be included in a screen of user interface 200. Selection of the different user interface elements illustrated in screen 200 of FIG. 2 may result in different animation responses.

Figure 3:
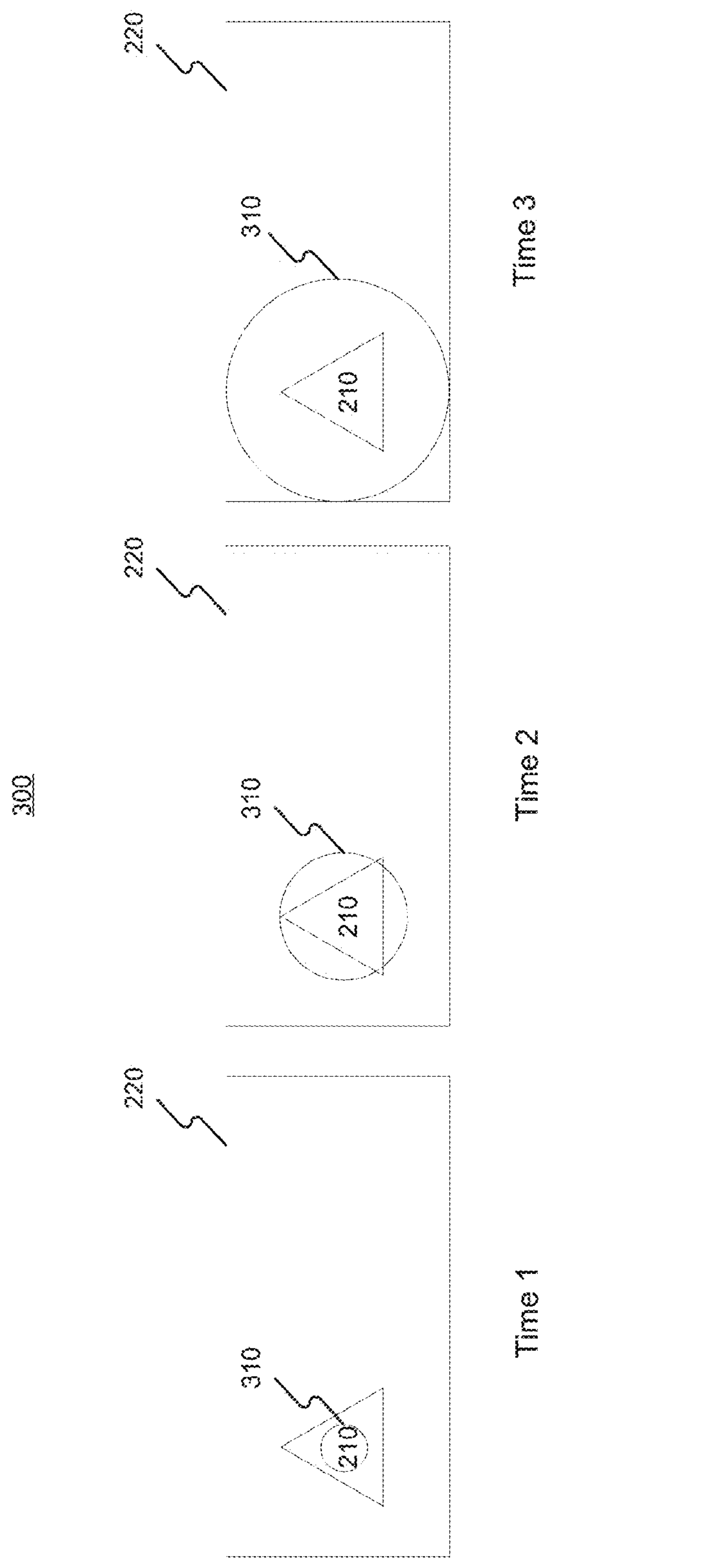
FIG. 3 illustrates an example of an animation of an object that changes over time based on a user selection of user interface element, such as an icon, consistent with embodiments of the present disclosure.

FIG. 3 illustrates an example 300 of an animation of an object that changes over time based on a user selection of a user interface element, such as an icon 210. Icon 210 may correspond, for example, to icon 210 in border 220 of screen 200 of FIG. 2. In some embodiments, icon 210 may be considered to be an unbounded user interface element. If a user selects icon 210, an animation of a circle 310 that expands over time may be rendered. The animation of circle 310 may begin to be rendered at the spatial location at which the user selected icon 210. FIG. 3 illustrates that at a first time (e.g., Time 1), the animation may display circle 310 at a first size. For example, at the first time, circle 310 may be displayed at its initial size. FIG. 3 illustrates that at a second time (e.g., Time 2), the animation may display circle 310 at a second size that is larger than the first size. FIG. 3 illustrates that at a third time (e.g., Time 3), the animation may display circle 310 at a third size that is larger than the second size. In some embodiments, circle 310 may be displayed at its maximum size at the third time. That is, the maximum size of circle 310 may be configured such that the diameter of circle 310 fills one dimension of the surrounding border. In some embodiments, circle 310 may continue to expand to a greater size, and edges of circle 310 may be clipped by border 220 so as not to be displayed at the maximum size of circle 310.

Figure 4:
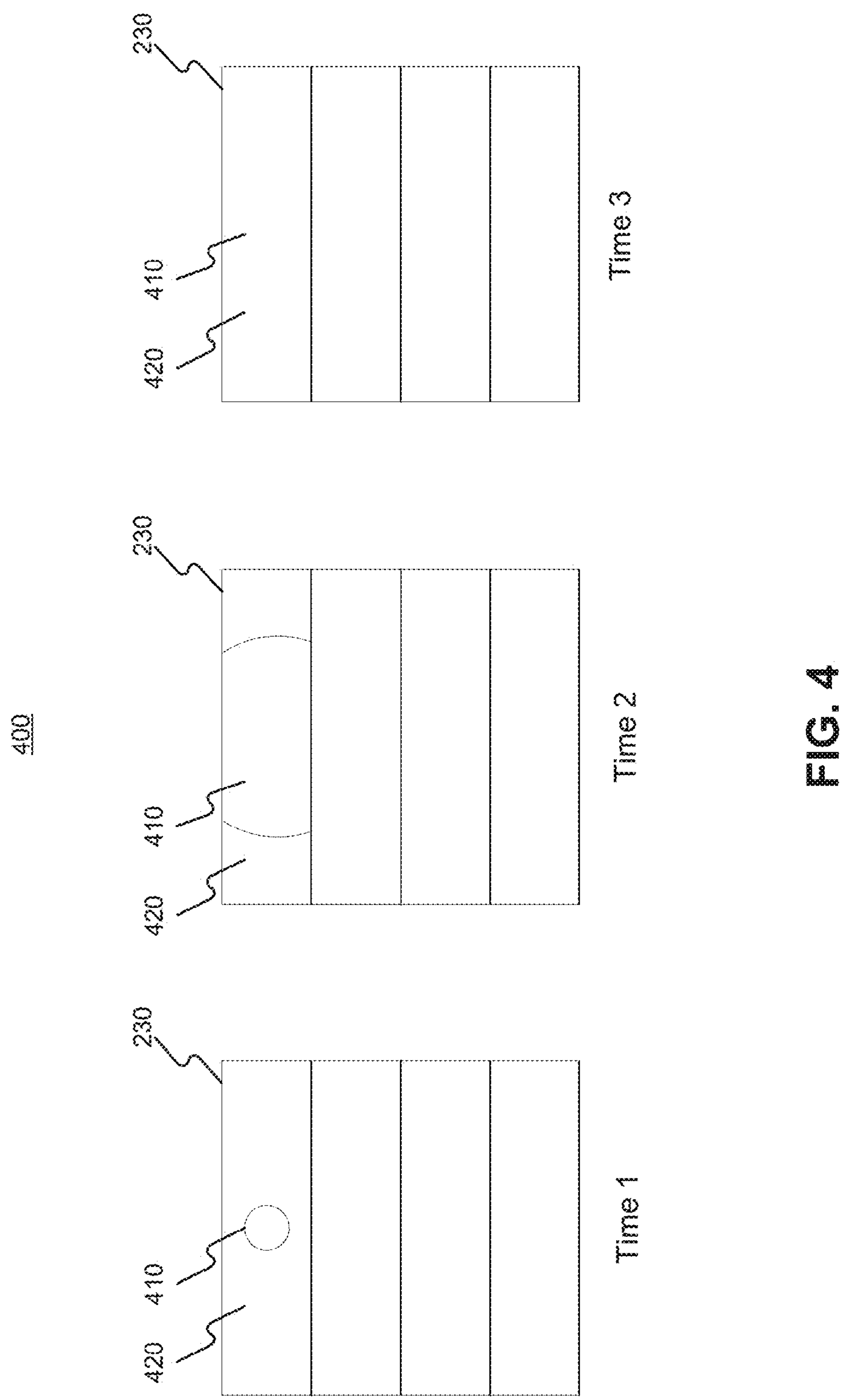
FIG. 4 illustrates an example of an animation of an object that changes over time based on a user selection of a user interface element, such as a menu item, consistent with embodiments of the present disclosure.

FIG. 4 illustrates an example 400 of an animation of an object that changes over time based on a user selection of a user interface element, such as a menu item 420 of a menu 230. Menu 230 may correspond, for example, to menu 230 of screen 200 of FIG. 2. In some embodiments, menu item 420 may be considered to be a bounded user interface element. If a user selects menu item 420, an animation of a circle 410 that expands over time may be rendered. The animation of circle 410 may begin to be rendered at the spatial location at which the user selected menu item 420. FIG. 4 illustrates that at a first time (e.g., Time 1), the animation may display circle 410 at a first size. For example, at the first time, circle 410 may be displayed at its initial size. FIG. 4 illustrates that at a second time (e.g., Time 2), the animation may display circle 410 at a second size that is larger than the first size. As shown in FIG. 4, portions of circle 410 that extend beyond the bounds of menu item 420 may be clipped and removed from view as circle 410 expands beyond the bounds of menu item 420. FIG. 4 illustrates that at a third time (e.g., Time 3), the animation may display circle 410 at a third size that is larger than the second size. In some embodiments, circle 410 may be displayed at its maximum size at the third time. As illustrated in FIG. 4, at the third time, the edges of circle 410 may be clipped by the border of menu item 420 so as not to be displayed as the circle expands beyond the bounds of menu item 420.

Figure 5:
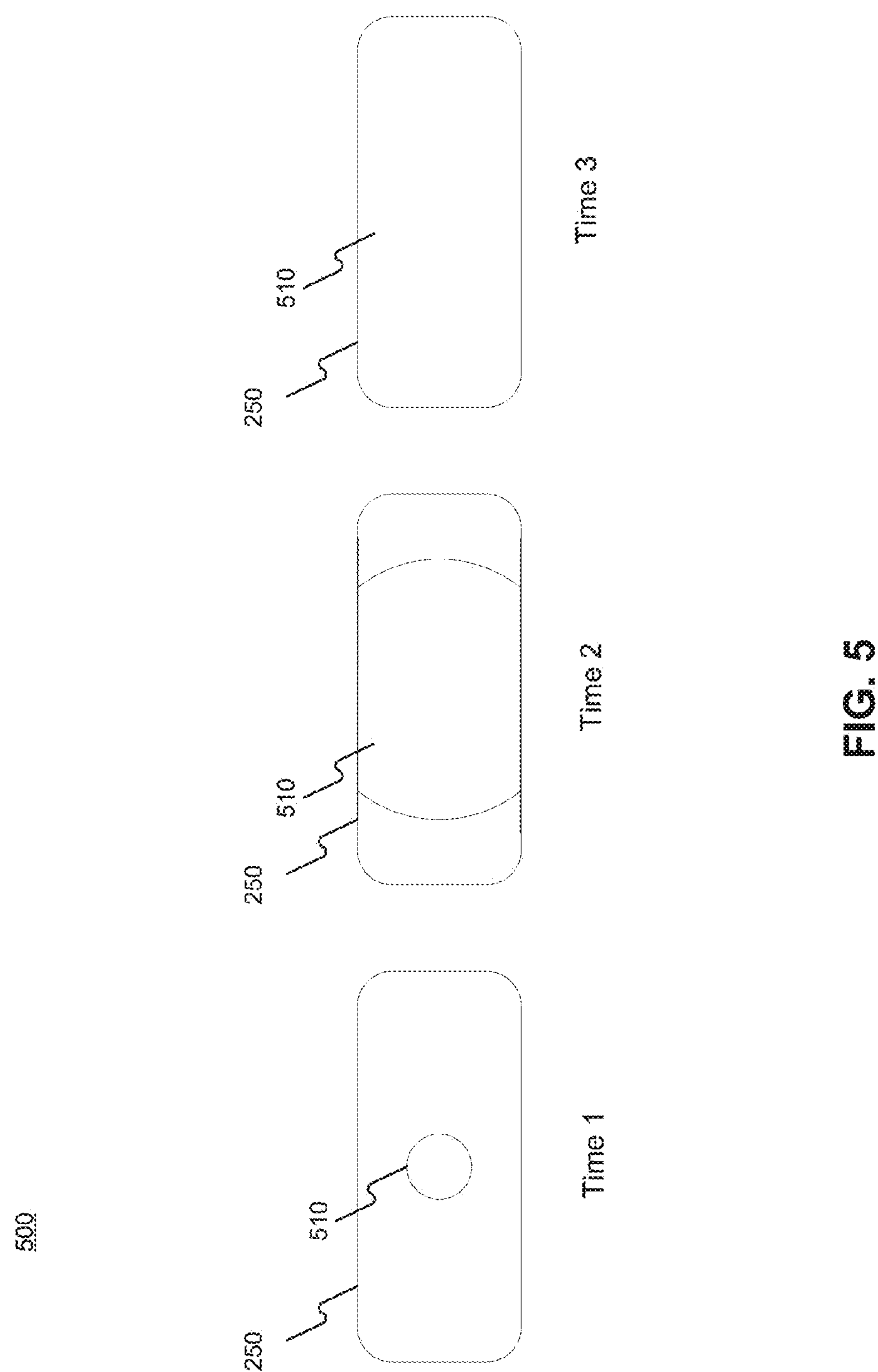
FIG. 5 illustrates an example of an animation of an object that changes over time based on a user selection of a user interface element, such as a button, consistent with embodiments of the present disclosure.

FIG. 5 illustrates an example 500 of an animation of an object that changes over time based on a user selection of a user interface element, such as a button 250. Button 250 may correspond, for example, to button 250 of screen 200 of FIG. 2. In some embodiments, button 250 may be considered to be a bounded user interface element. If a user selects button 250, an animation of a circle 510 that expands over time may be rendered. The animation of circle 510 may begin to be rendered at the spatial location at which the user selected button 250. FIG. 5 illustrates that at a first time (e.g., Time 1), the animation may display circle 510 at a first size. For example, at the first time, circle 510 may be displayed at its initial size. FIG. 5 illustrates that at a second time (e.g., Time 2), the animation may display circle 510 at a second size that is larger than the first size. As shown in FIG. 5, portions of circle 510 that extend beyond the bounds of button 250 may be clipped and removed from view as circle 510 expands beyond the bounds of button 250. FIG. 5 illustrates that at a third time (e.g., Time 3), the animation may display circle 510 at a third size that is larger than the second size. In some embodiments, circle 510 may be displayed at its maximum size at the third time. As illustrated in FIG. 5, at the third time, the edges of circle 510 may be clipped by the border of button 250 so as not to be displayed as the circle expands beyond the bounds of button 250.

Figure 6:
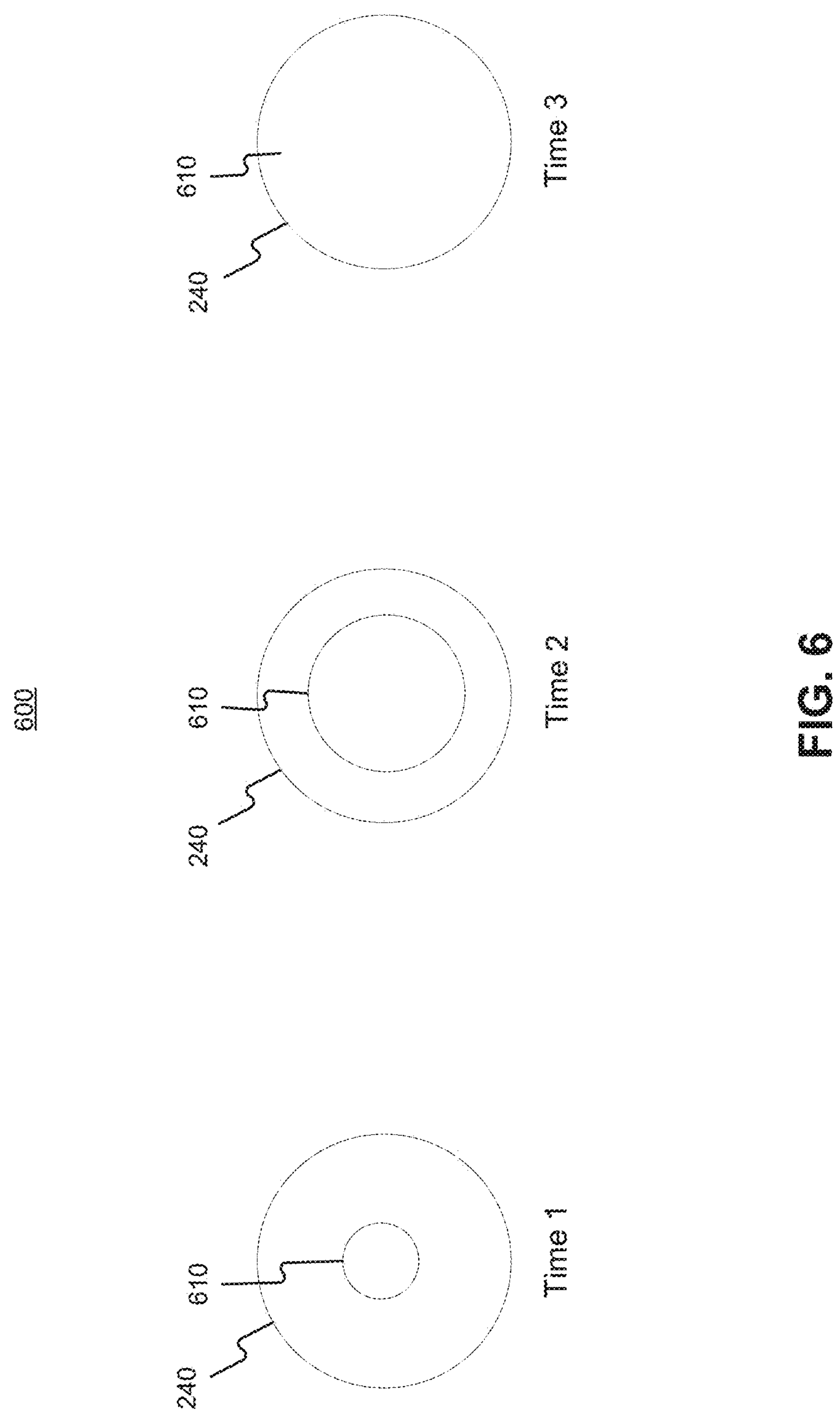
FIG. 6 illustrates an example of an animation of an object that changes over time based on a user selection of a user interface element, such as a control, consistent with embodiments of the present disclosure.

FIG. 6 illustrates an example 600 of an animation of an object that changes over time based on a user selection of a user interface element, such as a control 240. Control 240 may correspond, for example, to control 240 of screen 200 of FIG. 2. In some embodiments, control 240 may be considered to be a bounded user interface element. If a user selects control 240, an animation of a circle 610 that expands over time may be rendered. The animation of circle 610 may begin to be rendered at the spatial location at which the user selected control 240. FIG. 6 illustrates that at a first time (e.g., Time 1), the animation may display circle 610 at a first size. For example, at the first time, circle 610 may be displayed at its initial size. FIG. 6 illustrates that at a second time (e.g., Time 2), the animation may display circle 610 at a second size that is larger than the first size. FIG. 6 illustrates that at a third time (e.g., Time 3), the animation may display circle 610 at a third size that is larger than the second size. In some embodiments, circle 610 may be displayed at its maximum size at the third time. Portions of the circle that may expand beyond the circular shape of control 240 may be clipped by the border of control 240 so as not to be displayed as the circle expands beyond the bounds of control 240.

Figure 7:
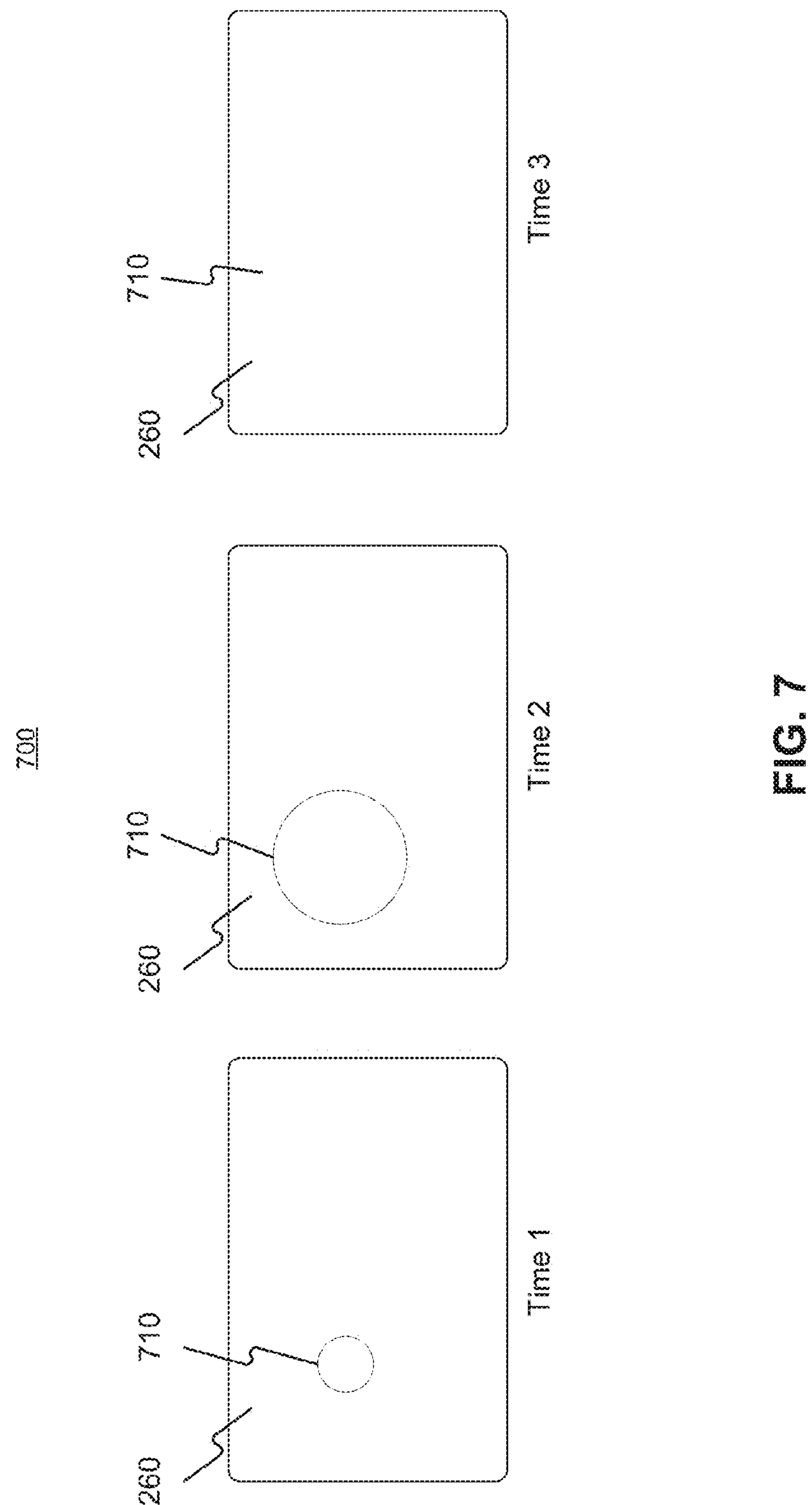
FIG. 7 illustrates an example of an animation of an object that changes over time based on a user selection of a user interface element, such as a background, consistent with embodiments of the present disclosure.

FIG. 7 illustrates an example 700 of an animation of an object that changes over time based on a user selection of a user interface element, such as a background 260. Background 260 may correspond, for example, to background 260 in screen 200 of FIG. 2. In some embodiments, background 260 may be considered to be an unbounded user interface element. If a user selects background 260, an animation of a circle 710 that expands over time may be rendered. The animation of circle 710 may begin to be rendered at the spatial location at which the user selected background 260. FIG. 7 illustrates that at a first time (e.g., Time 1), the animation may display circle 710 at a first size. For example, at the first time, circle 710 may be displayed at its initial size. FIG. 7 illustrates that at a second time (e.g., Time 2), the animation may display circle 710 at a second size that is larger than the first size. FIG. 7 illustrates that at a third time (e.g., Time 3), the animation may display circle 710 at a third size that is larger than the second size. In some embodiments, circle 710 may be displayed at its maximum size at the third time.

Figure 8:
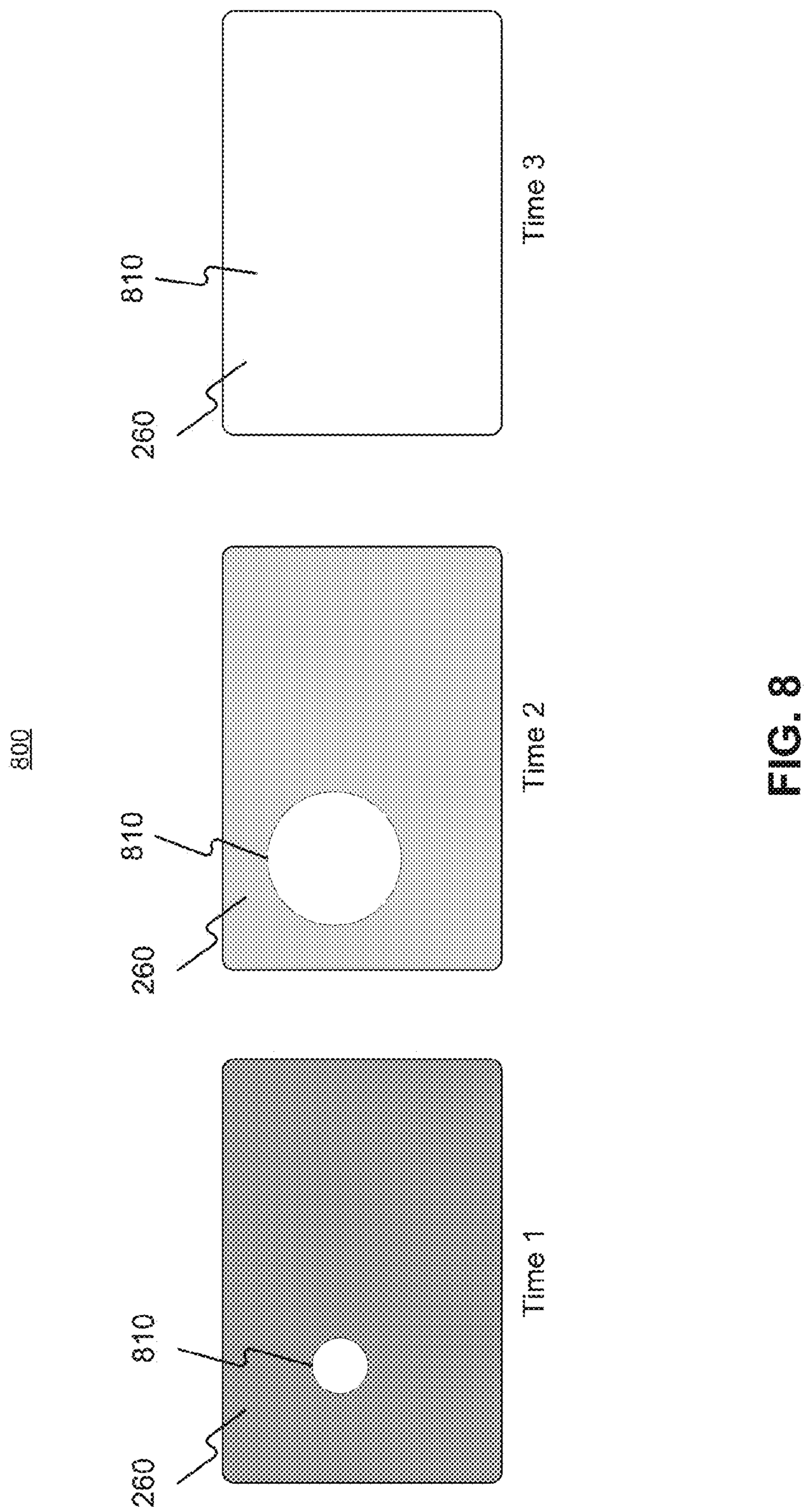
FIG. 8 illustrates another example of an animation of an object that changes over time based on a user selection of a user interface element, such as a background, consistent with embodiments of the present disclosure.

FIG. 8 illustrates another example 800 of an animation of an object that changes over time based on a user selection of a user interface element, such as a background 260. Background 260 may correspond, for example to background 260 in screen 200 of FIG. 2. In some embodiments, background 260 may be considered to be an unbounded user interface element. If a user selects background 260, an animation of a circle 810 that expands over time may be rendered. The animation of circle 810 may begin to be rendered at the spatial location at which the user selected background 260. Circle 810 may also be rendered in a color. In some embodiments, circle 810 may be animated in a color that is a different shade of the color of background 260.

FIG. 8 illustrates that at a first time (e.g., Time 1), the animation may display circle 810 at a first size. For example, at the first time, circle 810 may be displayed at its initial size. As illustrated at time 1 in FIG. 8, background 260 and circle 810 may be rendered in different shades of the same color at time 1. FIG. 8 illustrates that at a second time (e.g., Time 2), the animation may display circle 810 at a second size that is larger than the first size. As illustrated at time 2 in FIG. 8, background 260 and circle 810 may be rendered in different shades of the same color at time 2, though the shade of the color of background 260 may be more similar to the shade of the color of circle 810 than at the first time.

FIG. 8 illustrates that at a third time (e.g., Time 3), the animation may display circle 810 at a third size that is larger than the second size. As illustrated at time 3 in FIG. 8, background 260 and circle 810 may be rendered in the same shade of the same color at time 3, so that circle 810 is no longer visible to the user. In some embodiments, circle 810 may be displayed at its maximum size at the third time.

In some embodiments, the shade of a color of a user interface element may be adjusted to eventually match the shade of the color of the circle in situations where the user interface element is large (e.g., has a value of one or more dimensions that is greater than a predetermined value). This may prevent a user from being distracted by circles that have expanded to large sizes.

Figure 9:
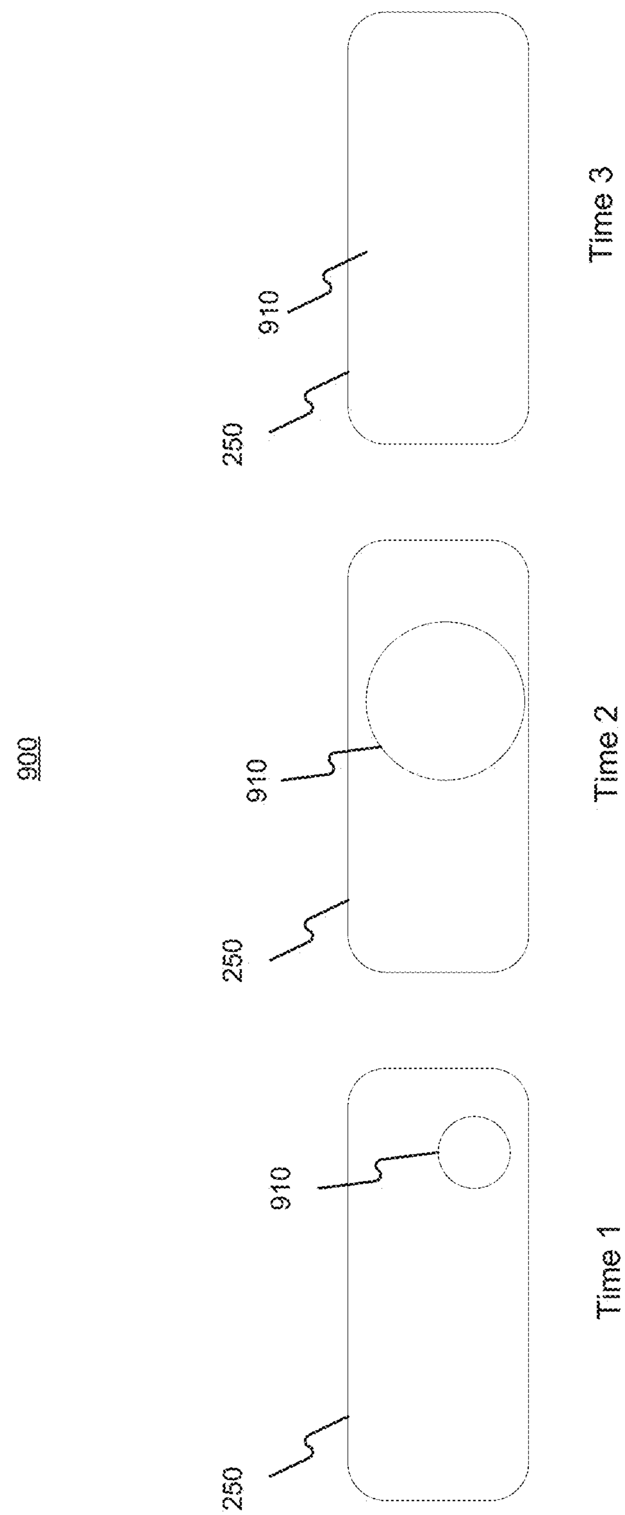
FIG. 9 illustrates another example of an animation of an object that changes over time based on a user selection of a user interface element, such as a button, consistent with embodiments of the present disclosure.

FIG. 9 illustrates another example 900 of an animation of an object that changes over time based on a user selection of a user interface element, such as a button 250. Button 250 may correspond, for example, to button 250 in screen 200 of FIG. 2. In some embodiments, button 250 may be considered to be a bounded user interface element. If a user selects button 250, an animation of a circle 910 that expands over time may be rendered. The animation of circle 910 may begin to be rendered at the spatial location at which the user selected button 250. In the example of FIG. 9, for example, the user may have selected button 250 in the lower right hand corner of the button. FIG. 9 illustrates that at a first time (e.g., Time 1), the animation may display circle 910 at a first size. For example, at the first time, circle 910 may be displayed at its initial size.

FIG. 9 illustrates that at a second time (e.g., Time 2), the animation may display circle 910 at a second size that is larger than the first size. Moreover, at the second time, the center of circle 910 may have migrated toward the center of button 250 from the spatial location at which the user selected button 250. FIG. 9 illustrates that at a third time (e.g., Time 3), the animation may display circle 910 at a third size that is larger than the second size. In some embodiments, circle 910 may be displayed at its maximum size at the third size. As illustrated in FIG. 9, at the third time, the edges of circle 910 may be clipped by the border of button 250 so as not to be displayed as the circle expands beyond the bounds of button 250. In some embodiments, the center of circle 910 may have migrated to the center of button 250 at the time at which circle 910 reaches its maximum size.

By migrating the center of an animated circle toward the center of a user interface element as the circle expands over time, oddly shaped renderings may be avoided. For example, if the user selected a user interface element at a bottom, side, or corner location of the user interface element, the circle may expand into a moon shape as a result of clipping by one or more borders of the user interface element. By migrating the center of the circle toward the center of the user interface element, such shapes can be avoided.

Figure 10:
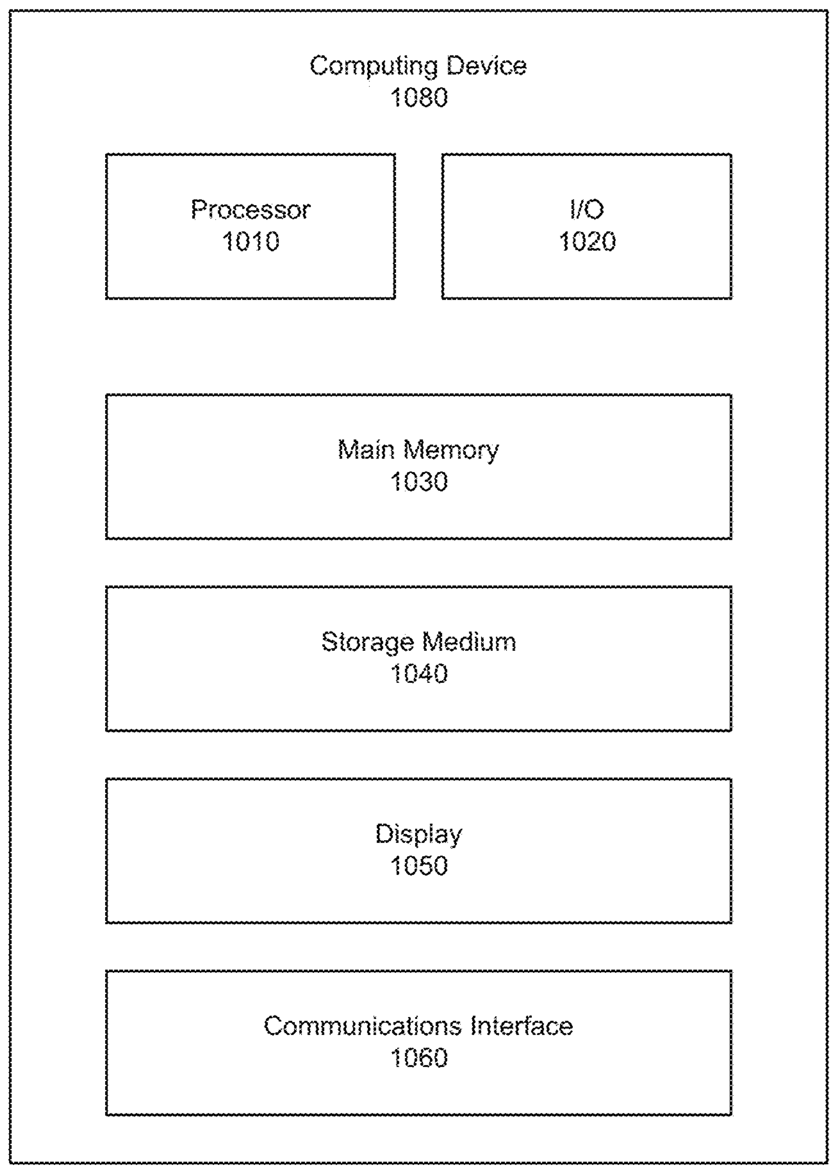
FIG. 10 illustrates an example computer system for implementing embodiments and features consistent with the present disclosure.

FIG. 10 is a block diagram illustrating an example computer system 1000 that may be used for implementing embodiments consistent with the present disclosure, including the example systems and methods described herein. Computer system 1000 may include one or more computing devices 1080. Computer system 1000 may be used to implement client device(s) 1120, and/or server(s) 1140, of computing environment 1100 of FIG. 11. The arrangement and number of components in computer system 1000 is provided for purposes of illustration. Additional arrangements, number of components, or other modifications may be made, consistent with the present disclosure.

As shown in FIG. 1000, a computing device 1080 may include one or more processors 1010 for executing instructions. Processors suitable for the execution of instructions include, by way of example, both general and special purpose microprocessors, and any one or more processors of any kind of digital computer. A computing device 1080 may also include one or more input/output (I/O) devices 1020. By way of example, I/O devices 1020 may include keys, buttons, mice, joysticks, styluses, gesture sensors (e.g., video cameras), motion sensors (e.g., infrared sensors, ultrasound sensors, etc.), voice sensors (e.g., microphones), etc. Keys and/or buttons may be physical and/or virtual (e.g., provided on a touch screen interface).

A computing device 1080 may include one or more storage devices configured to store data and/or software instructions used by processor(s) 1010 to perform operations consistent with disclosed embodiments. For example, a computing device 1080 may include main memory 1030 configured to store one or more software programs that, when executed by processor(s) 1010, cause processor(s) 1010 to perform functions or operations consistent with disclosed embodiments. In some embodiments, software instructions for performing operations consistent with disclosed embodiments may be provided in an application programming interface (API) that is made available to developers of applications. For example, the software instructions may be included as part of an API available to developers of applications for certain computing platforms. The API may be downloaded by a developer, and instructions in the API may be executed by processor(s) 1010 to perform functions or operations consistent with disclosed embodiments.

By way of example, main memory 1030 may include NOR or NAND flash memory devices, read only memory (ROM) devices, random access memory (RAM) devices, etc. A computing device 1080 may also include on or more storage mediums 1040. By way of example, storage medium(s) 1040 may include hard drives, solid state drives, tape drives, redundant array of independent disks (RAID) arrays, etc. Although FIG. 1000 illustrates only one main memory 1030 and one storage medium 1040, a computing device 1080 may include any number of main memories 1030 and storage mediums 1040. Further, although FIG. 10 illustrates main memory 1030 and storage medium 1040 as part of computing device 1080, main memory 1030 and/or storage medium 1040 may be located remotely and computing device 1080 may be able to access main memory 1030 and/or storage medium 1040 via network(s), such as network(s) 1030 of computing environment 1100 of FIG. 11.

Storage medium(s) 1040 may be configured to store data, and may store data received from one or more of server(s) 1040 or client device(s) 1020. The data may take or represent various content or information forms, such as content, metadata, documents, textual content, image files, video files, markup information (e.g., hypertext markup language (HTML) information, extensible markup language (XML) information), software applications, instructions, and/or any other type of information that may be with a user interface of an application.

A computing device 1080 may also include one or more displays 1050 for user interfaces, displaying data, and information. Display(s) 1050 may be implemented using one or more display panels, which may include, for example, one or more cathode ray tube (CRT) displays, liquid crystal displays (LCDs), plasma displays, light emitting diode (LED) displays, touch screen type displays, projector displays (e.g., images projected on a screen or surface, holographic images, etc.), organic light emitting diode (OLED) displays, field emission displays (FEDs), active matrix displays, vacuum fluorescent (VFR) displays, 3-dimensional displays, electronic paper (e-ink) displays, microdisplays, or any combination of the above types of displays.

A computing device 1080 may further include one or more communications interfaces 1060. Communication interface(s) 1060 may allow software and/or data to be transferred between server(s) 1040 and client device(s) 1020. Examples of communications interface(s) 1060 may include modems, network interface cards (e.g., Ethernet card), communications ports, personal computer memory card international association (PCMCIA) slots and cards, antennas, etc. Communication interface(s) 1060 may transfer software and/or data in the form of signals, which may be electronic, electromagnetic, optical, and/or other types of signals. The signals may be provided to/from communications interface(s) 1060 via a communications path (e.g., network(s) 1130), which may be implemented using wired, wireless, cable, fiber optic, radio frequency (RF), and/or other communications channels.

The disclosed embodiments are not limited to separate programs or computers configured to perform dedicated tasks. For example, a server 1140 may include a main memory 1030 that stores a single program or multiple programs and may additionally execute one or more programs located remotely from server 1140. Similarly, a client device 1120 may execute one or more remotely stored programs instead of, or in addition to, programs stored on client device 1120. In some example embodiments, a server 1140 may be capable of accessing separate server(s) and/or computing devices that generate, maintain, and provide web sites.

Figure 11:
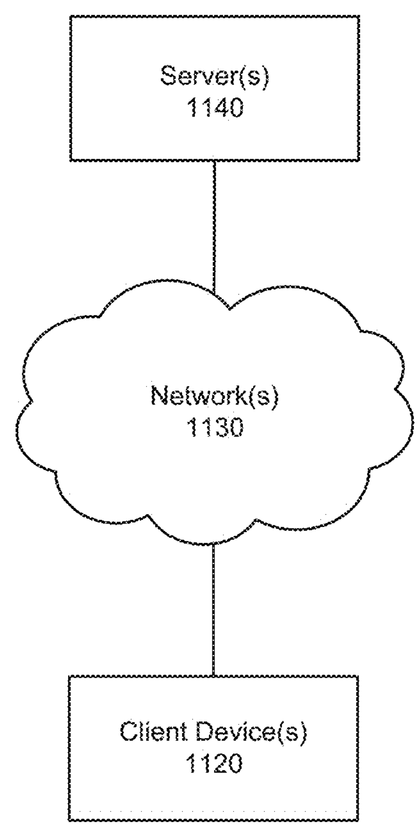
FIG. 11 illustrates an example computing environment for implementing embodiments and features consistent with the present disclosure.

FIG. 11 illustrates a block diagram of an example computing environment 1100 for implementing embodiments and features of the present disclosure. The arrangement and number of components in environment 1100 is provided for purposes of illustration. Additional arrangements, number of components, and other modifications may be made, consistent with the present disclosure.

As shown in FIG. 11, computing environment 1100 may include one or more client devices 1120. By way of example, a client device 1120 could be a mobile phone, smart phone, tablet, netbook, electronic reader, personal digital assistant (PDA), personal computer, laptop computer, smart watch, gaming device, desktop computer, set-top box, television, personal organizer, portable electronic device, smart appliance, navigation device, and/or other types of computing devices. In some embodiments, a client device 1120 may be implemented with hardware devices and/or software applications running thereon. A user may use a client device 1120 to communicate with server(s) 1140 over network(s) 1130. A client device 1120 may communicate by transmitting data to and/or receiving data from server(s) 1140. In some embodiments, one or more of client device(s) 1120 may be implemented using a computer system, such as computer system 1000 of FIG. 10.

Computing environment 1100 may also include one or more server(s) 1140. By way of example, server(s) 1140 could include any combination of one or more of web servers, databases, mainframe computers, general-purpose computers, personal computers, or other types of computing devices. In some embodiments, one or more of server(s) 1140 may be configured to host a web page, implement a search engine, index information, store information, and/or retrieve information. In some embodiments, a server 1140 may be a standalone computing system or apparatus, or it may be part of a larger system. For example, server(s) 1140 may represent distributed servers that are remotely located and communicate over a communications network, or over a dedicated network, such as a local area network (LAN). Server(s) 1140 may include one or more back-end servers for carrying out one or more aspects of the present disclosure.

Server(s) 1140 may be implemented as a server system comprising a plurality of servers, or a server farm comprising a load balancing system and a plurality of servers. In some embodiments, a server 1140 may be implemented with hardware devices and/or software applications running thereon. A server 1140 may communicate with client device(s) 1120 over network(s) 1130. For example, a server 1140 may communicate by transmitting data to and/or receiving data from client device(s) 1120. In some embodiments, one or more of server(s) 1140 may be implemented using a computer system, such as computer system 1000 of FIG. 10.

In some embodiments, server(s) 1140 may store instructions for rendering animations, consistent with embodiments disclosed herein. Client device(s) 820 may download the instructions, and may use the instructions to render animations in user interfaces of one or more applications. Thus, a developer of an application may simply download the instructions to a client device 1120, and use the instructions to render animations in a user interface of the application.

Computing environment 1100 may still further include one or more networks 1130. Network(s) 1130 may connect server(s) 1140 with client device(s) 1120. Network(s) 1130 may provide for the exchange of information, such as queries for information and results, between client device(s) 1120 and server(s) 1140. Network(s) 1130 may include one or more types of networks interconnecting client device(s) 1120 and server(s) 1140.

Network(s) 1130 may include one or more wide area networks (WANs), metropolitan area networks (MANs), local area networks (LANs), personal area networks (PANs), or any combination of these networks. Network(s) 1130 may include one network type, or a combination of a variety of different network types, including Internet, intranet, Ethernet, twisted-pair, coaxial cable, fiber optic, cellular, satellite, IEEE 802.11, terrestrial, Bluetooth, infrared, wireless universal serial bus (wireless USB), and/or other types of wired or wireless networks.

While illustrative embodiments have been described herein, the scope includes any and all embodiments having equivalent elements, modifications, omissions, combinations (e.g., of aspects across various embodiments), adaptations and/or alternatives based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including reordering steps and/or inserting or deleting steps.

The many features and advantages of the disclosure are apparent from the detailed specification, and thus, it is intended that the appended claims cover all systems and methods, which fall within the true spirit and scope of the disclosure. As used herein, the indefinite articles "a" and "an" mean "one or more" in open-ended claims containing the transitional phrase "comprising," and/or "having." Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed:

1. A computer-implemented method for rendering an animation in a user interface, comprising the following operations performed by one or more processors:

receiving an indication of a user selection of a user interface element in the user interface, wherein the element is bounded by a border;

identifying characteristics of the selected element;

determining coordinates for the user selection, wherein the coordinates correspond to a spatial location of the user selection in the user interface; and rendering within the element an animation of an object that begins at the spatial location of the user selection, wherein the animated object grows in size over time, and wherein one or more edges of the object are clipped by the border of the element for at least a portion of the animation.

2. The method of claim 1, wherein the identified characteristics of the selected element include one or more of a width, height, radius, shape, and bounding status.

3. The method of claim 1, wherein the center of the animated object migrates to the center of the selected element as the object changes over time.

4. The method of claim 1, wherein the animated object provides a ripple effect.

5. The method of claim 1, further comprising:

determining a selection time corresponding to when the user selection was made, wherein the animation of the object is rendered based on the selection time.

6. The method of claim 5, wherein the selection time corresponds to when an input was pressed by a user to initiate the user selection.

7. The method of claim 5, wherein the selection time corresponds to when an input was released by a user to complete the user selection.

8. The method of claim 5, further comprising:

determining a color of the selected user interface element; and rendering the animation of the object in a different shade of the color.

9. The method of claim 8, further comprising:

changing a shade of the color of the selected user interface element as the animation of the object changes over time, wherein at a certain time during the animation, the shade of the color of the selected user interface element and the shade of the color of the object is the same.

10. The method of claim 1, further comprising:

determining one of an acceleration or velocity based on the identified characteristics of the selected element; and changing the animation of the object over time based on the determined acceleration or velocity.

11. The method of claim 1, wherein the object is a circle, and the animation is rendered so that the circle expands over time.

12. A computer-implemented system for rendering an animation in a user interface, comprising:

a memory that stores a set of instructions; and at least one processor that executes the set of instructions to:

receive an indication of a user selection of a user interface element in the user interface, wherein the element is bounded by a border;

identify characteristics of the selected element;

determine coordinates for the user selection, wherein the coordinates correspond to a spatial location of the user selection in the user interface; and render within the element an animation of an object that begins at the spatial location of the user selection, wherein the animated object grows in size over time, and wherein one or more edges of the object are clipped by the border of the element for at least a portion of the animation.

13. The system of claim 12, wherein the identified characteristics of the selected element include one or more of a width, height, radius, shape, and bounding status.

14. The system of claim 12, wherein the center of the animated object migrates to the center of the selected element as the object changes over time.

15. The system of claim 12, wherein the animated object provides a ripple effect.

16. The system of claim 12, wherein the at least one processor further executes the instructions to:

determine a selection time corresponding to when the user selection was made, wherein the animation of the object is rendered based on the selection time.

17. The system of claim 16, wherein the selection time corresponds to when an input was pressed by a user to initiate the user selection.

18. The system of claim 16, wherein the selection time corresponds to when an input was released by a user to complete the user selection.

19. The system of claim 12, wherein the at least one processor further executes the instructions to:

determine one of an acceleration or velocity based on the identified characteristics of the element; and change the animation of the object over time based on the determined acceleration or velocity.

20. A non-transitory computer-readable medium storing a set of instructions that, when executed by one or more processors, cause the one or more processors to perform a method, the method comprising:

receiving an indication of a user selection of a user interface element in a user interface, wherein the element is bounded by a border;

identifying characteristics of the selected element;

determining coordinates for the user selection, wherein the coordinates correspond to a spatial location of the user selection in the user interface; and rendering within the element an animation of an object that begins at the spatial location of the user selection, wherein the animated object grows in size over time, and wherein one or more edges of the object are clipped by the border of the element for at least a portion of the animation.

* * * * *